(12) United States Patent
Mackey et al.

(10) Patent No.: US 7,123,674 B2
(45) Date of Patent: Oct. 17, 2006

(54) REDUCING LATENCY AND POWER IN ASYNCHRONOUS DATA TRANSFERS

(75) Inventors: Richard P. Mackey, Phoenix, AZ (US); David R. Smith, Phoenix, AZ (US); Jeffrey J. McCoskey, Phoenix, AZ (US)

(73) Assignee: Intel Corporation, Santa Clara, CA (US)

(*) Notice: Subject to any disclaimer, the term of this patent is extended or adjusted under 35 U.S.C. 154(b) by 812 days.

(21) Appl. No.: 09/872,277

(22) Filed: May 31, 2001

(65) Prior Publication Data
US 2002/0181631 A1 Dec. 5, 2002

(51) Int. Cl.
*H04L 7/00* (2006.01)
(52) U.S. Cl. ...................... 375/354; 375/371
(58) Field of Classification Search ............... 375/353, 375/355, 371, 373, 354, 372; 326/94
See application file for complete search history.

(56) References Cited

U.S. PATENT DOCUMENTS

| | | | | |
|---|---|---|---|---|
| 5,036,221 A | * | 7/1991 | Brucculeri et al. | 326/94 |
| 5,450,546 A | * | 9/1995 | Krakirian | 710/57 |
| 6,067,629 A | | 5/2000 | Murray et al. | |
| 6,384,634 B1 | * | 5/2002 | Brissette et al. | 326/93 |

* cited by examiner

*Primary Examiner*—Kevin Kim
(74) *Attorney, Agent, or Firm*—Fish & Richardson P.C.

(57) ABSTRACT

Reducing latency and power in the transfer of data between a source and destination domain involves the production of a source-enable signal base on a synchronous-pulse signal. The source-enable signal operates to enable a source register to capture data from a source domain. The source-enable signal may be controlled by a source-inhibit signal. The source-inhibit signal prevents the synchronous-pulse signal from producing the source enable signal and capture clock until data is available for transmission.

25 Claims, 9 Drawing Sheets

REDUCING LATENCY AND POWER IN ASYNCHRONOUS DATA TRANSFERS

TECHNICAL FIELD

This invention relates to transmitting data, and more particularly to reducing latency and power in asynchronous data transfers.

BACKGROUND

Transmitting data involves a transfer of data from a source domain to a destination domain. The transfer of data needs to be predictable to ensure that the destination domain receives the proper data from the source domain.

Meta-stability is the ability of a logic component (for example a flip-flop) to possess an indeterminate/unpredictable value for a finite period of time. Meta-stability occurs when the logic component attempts to capture (that is, sample) data before the data (that is, the information intended to occur on the component) is stable.

The probability of meta-stability directly effects the mean-time-between-failure ("MTBF") calculation for a product. As the MTBF increases, the usable duration and desirability of the product decreases. Thus, meta-stability needs to be avoided.

Asynchronous data transfers involve transmitting data from a source domain (for example, a microprocessor) to a destination domain (for example, a memory device) operating (that is, capturing or sampling data) at different clock phases and/or frequencies. Asynchronous data transfers need an interface that compensates for the effects of meta-stability, ensuring the data sent between the two domains is stable before sampling.

Latency is a delay in the transfer of data that an interface introduces to compensate for the effects of meta-stability.

DESCRIPTION OF DRAWINGS

Like reference symbols in the various drawings indicate like elements.

DETAILED DESCRIPTION

Figure 1:
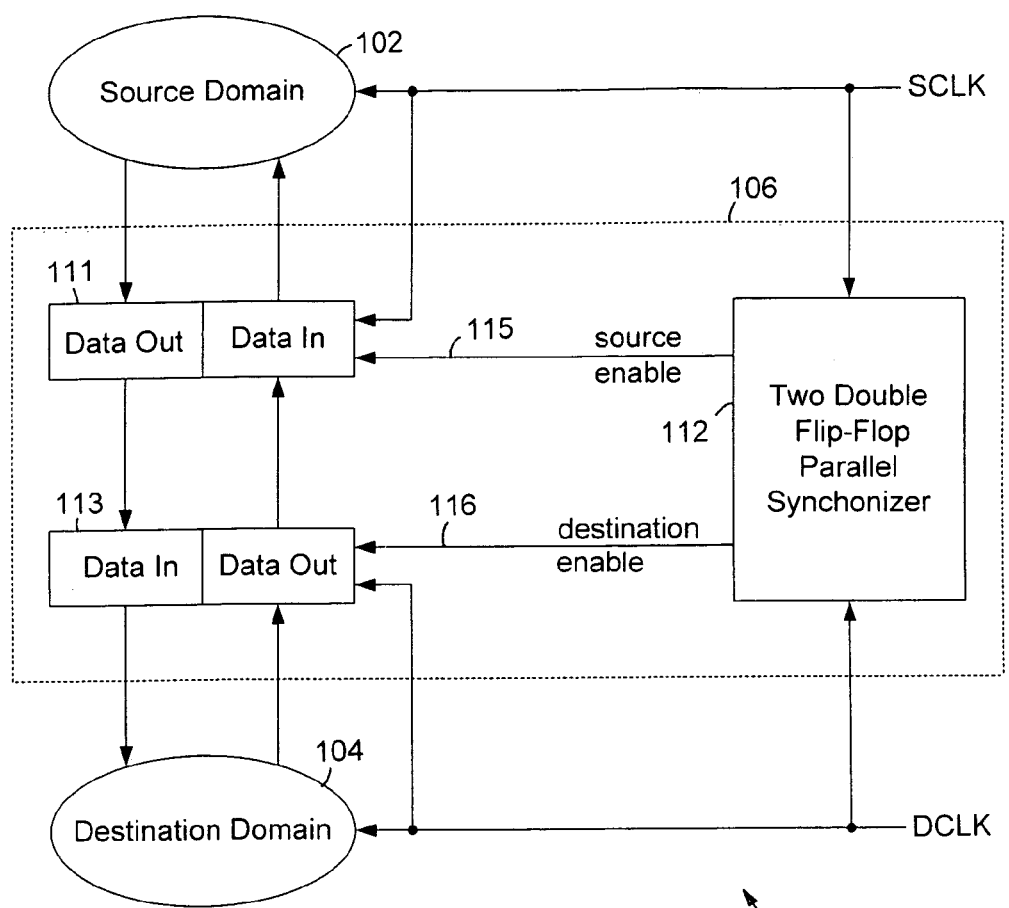
FIG. 1 is a prior art block diagram of a computer system.
Figure 2:
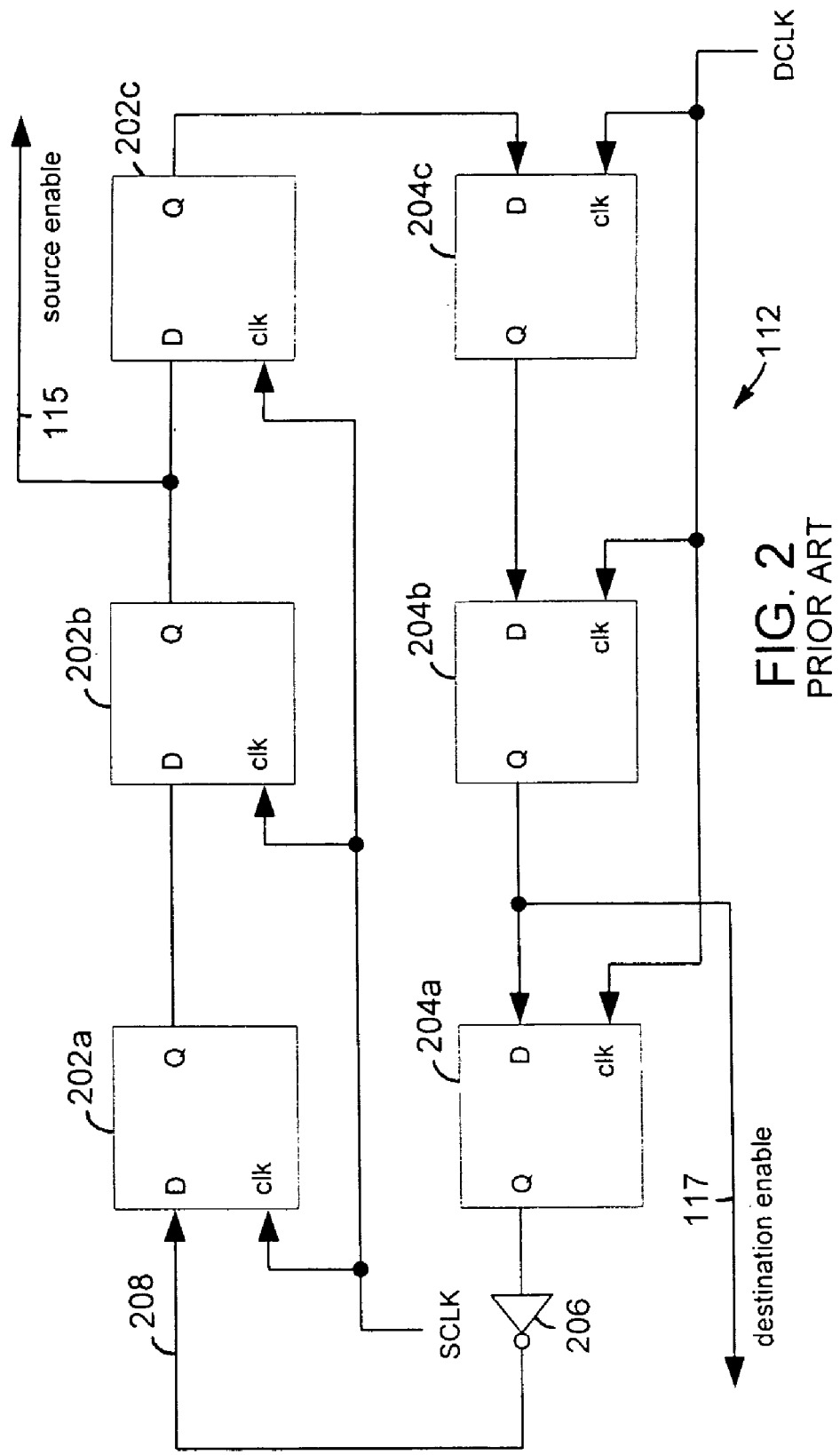
FIG. 2 is a prior art block diagram of a two double flip-flop parallel synchronizer.

FIGS. 1 and 2 illustrate a prior art scheme that compensates for asynchronous data transfers between source and destination domains. In particular, system 100 includes source domain 102 operating at source clock SCLK connected to destination domain 104 operating at destination clock DCLK by interface 106. Interface 106 includes source register 111, a destination register 113 and a two double flip-flop parallel synchronizer 112.

Parallel synchronizer 112 (FIG. 2), which is also know as a 'fly-wheel', includes two sets of three flip-flops 202a–c and 204a–c and inverter 206 connected in a loop. The first set of three flip-flops 202a, 202b and 202c operate at the source clock SCLK phase and frequency. The second set of three flip-flops 204a, 204b and 204c operate at the destination clock DCLK phase and frequency.

Inverter 206 is positioned between the output Q and input D of two of the flip-flops in the loop and operates to invert the output Q of one flip-flop before it reaches the input D of the next flip-flop. Inverter 206 operates to create a synchronous pulse signal propagating on wire 208 between the outputs Q and inputs D of flip-flops 202a–c and 204a–c.

The synchronous pulse signal propagates (that is, is sampled by the flip-flops) continuously through each flip-flop 202a–c at a rate dictated by the source clock SCLK and each flip-flop 204a–c at a rate dictated by the destination clock DCLK. The continuous synchronous pulse signal operates to produce a stable source enable signal 115 and a stable destination enable signal 117.

The stable source enable 115 and destination enable 117 signals operate to enable source register 111 and destination register 113 to accept data from their respective domains at a rate for which both of the domains may handle a transfer of data. In this system, the latency for transferring data between the source and destination domain is two or three clock cycles in source domain and two or three clock cycles in the destination domain for a total of up to six clock cycles for each data transfer. This system assumes that data is continuously transferred between two domains in a 1-to-1 ratio. This is not always the case.

Figure 3:
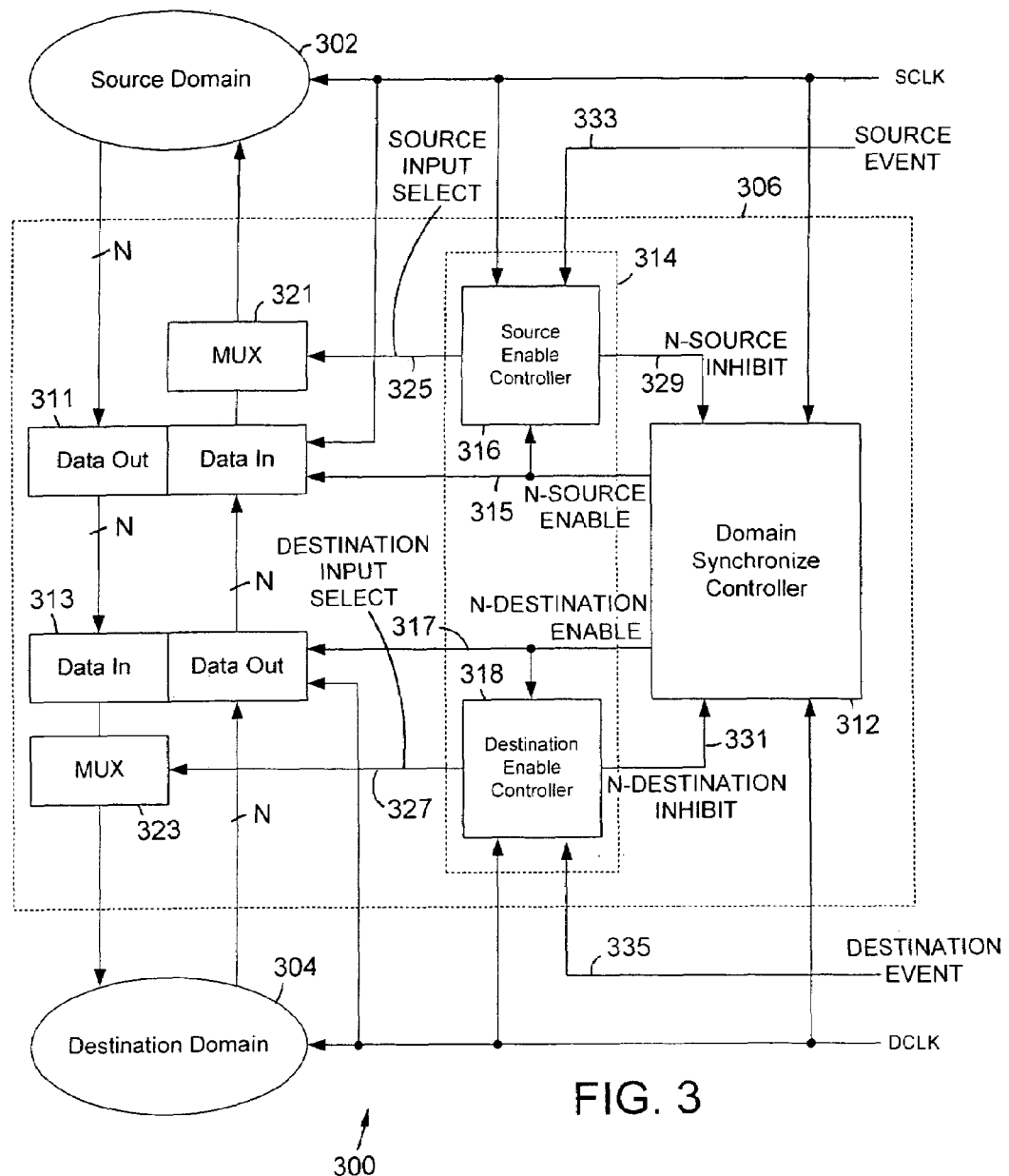
FIG. 3 is block diagram of a computer system according to one embodiment of the invention.

A system 300 (FIG. 3) includes a source domain 302 and a destination domain 304 connected by an interface 306. Source domain 302 (here for example, a microprocessor) operates at source clock SCLK phase and frequency. Destination domain 304 (here for example, a memory device) operates at destination clock DCLK phase and frequency.

Interface 306, includes a N-bit interface (for example, a N-bit bus), source registers 311, destination registers 313, domain-synchronizing controller 312 and enable controller 314. Here enable controller 314 includes source-enable controller 316 and destination enable controller 318.

Source registers 311, here two sets of N-enable flip-flops divided into Data Out and Data In portions, operate at clock signal SCLK and function to capture data according to N-source enable signals 315 from domain-synchronizing controller 312. Destination registers 313, here two sets of N-enable flip-flops divided into Data Out and Data In portions, operate at clock signal DCLK and function to capture data according to N-destination enable signals 317 from domain-synchronizing controller 312. Here, Data In for both source and destination registers 311 and 313 are connected to their respective domains through multiplexors 321 and 323 which may be included to provide for the sequential transfer of data into domains 302 and 304.

Multiplexor 321 provides data within the Data In portion of source registers 311 to source domain 302 according to source input select signal 325 from source-enable controller 316. Multiplexor 323 provides data within the Data In portion of destination register 313 to destination domain 304 according to destination input select signal 327 from destination enable controller 318.

Figure 4:
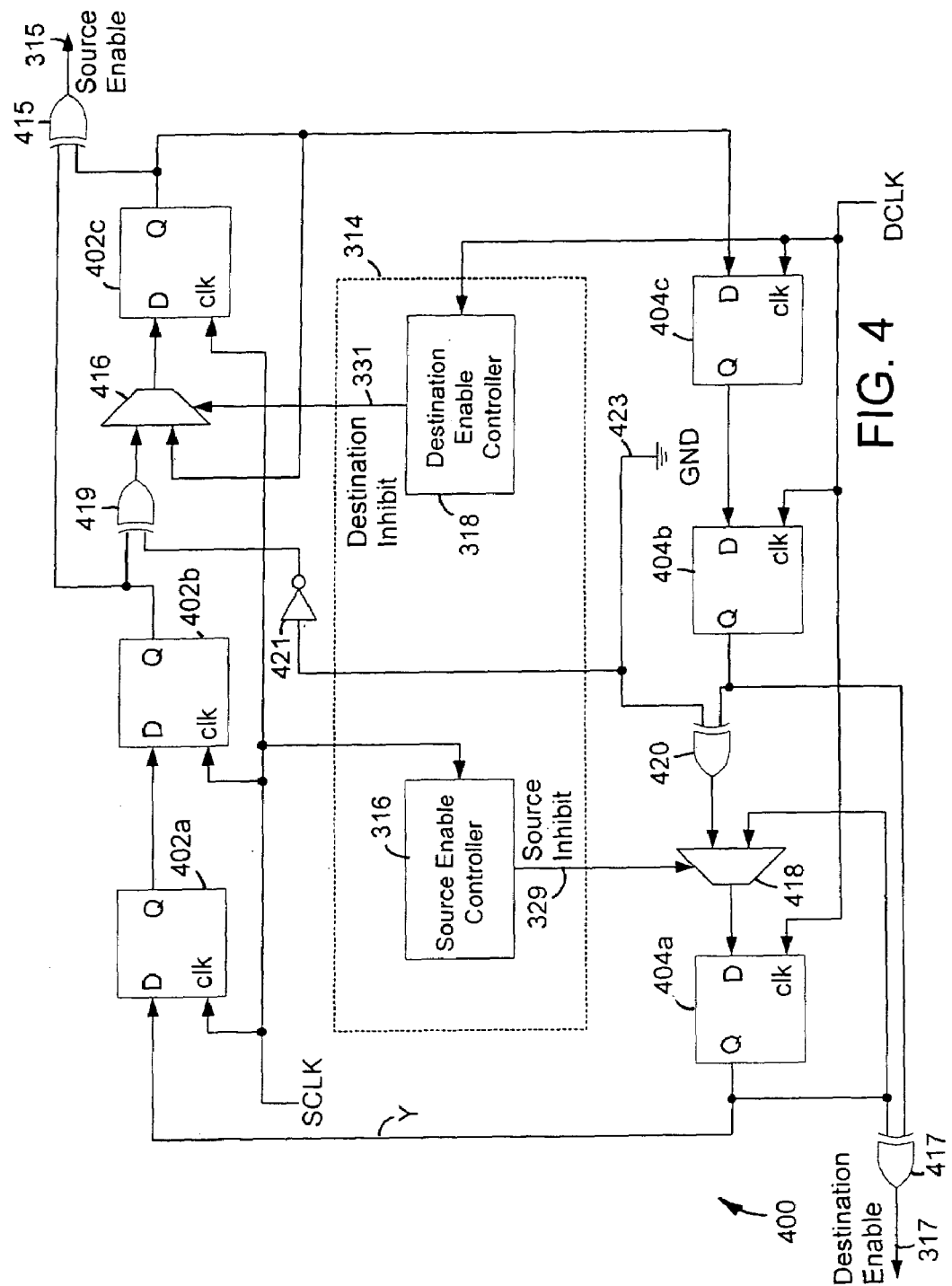
FIG. 4 is a block diagram of a domain-synchronizing controller according to one embodiment of the invention.

Domain-synchronizing controller 312 includes N-parallel synchronizers 400 (FIG. 4). Here, parallel synchronizer 400 includes flip-flops 402a–c and 404a–c and logic components 415, 416, 417, 418, 419, 420 and 421. Flip-flops 402*a–c* and 404*a–c* and logic components 416, 418, 419 and 420 are connected together in a loop which functions to produce a controllable synchronous-pulse signal Y (that is, a stoppable 'fly-wheel').

Logic component 419, here an XOR gate, is positioned between the output Q of flip-flop 402*b* and the input of logic component 416. Logic component 419 operates to invert the output Q of flip-flop 402*b* producing synchronous-pulse signal Y propagating through synchronizer 400.

Logic component 416, here a multiplexor, is positioned between the output of logic component 419 and the input D of flip-flop 402*c*. Logic component 416 operates to select either the output of logic component 419 or output Q of flip-flop 402*c* according to destination inhibit signal 331.

The selection of the output of logic component 419 allows synchronous-pulse signal Y to propagate through flip-flop 402*c*. The selection of output Q of 402*c* prevents the propagation of synchronous-pulse signal Y through flip-flop 402*c*. Accordingly, logic component 416 and flip-flop 402*c*, which together may be referred to as an enable flip-flop, introduce a control (that is, a stopping point in the synchronous-pulse signal Y) permitting destination inhibit signal 331 to control the propagation of signal Y through synchronizer 400.

Similarly logic component 418, here also a multiplexor, is positioned between the output of logic component 420, here an XOR gate and the input D of flip-flop 404*a*. Logic component 418 operates to select either the output of logic component 420, here operating as a buffer, or output Q of flip-flop 404*a* according to source inhibit signal 329.

The selection of the output of logic component 420 allows synchronous-pulse signal Y to propagate through flip-flop 404*a*. The selection of output Q of 404*a* prevents synchronous-pulse signal Y from propagating through flip-flop 404*a*. Accordingly, logic component 418 introduces a second control permitting source inhibit signal 329 to control the propagation of signal Y through synchronizer 400.

The controllable synchronous-pulse signal Y propagates through each flip-flop 402*a–c* at a rate dictated by the source clock SCLK and through each flip-flop 404*a–c* at a rate dictated by the destination clock DCLK. The stoppable 'fly-wheel' operates to produce a stable, synchronous source enable signal 315 and a stable, synchronous destination enable signal 317 when destination inhibit signal 331 and/or source inhibit signal 329 allow synchronous-pulse signal Y to propagate through controllable synchronizer 400. The generation of the source and destination inhibit signals 329 and 331 will be described in greater detail below.

Logic components 419 and 420 operate with inverter 421 to determine which side (that is, either the source or destination side) of synchronizer 400 to originate synchronous signal Y. Here, line 423 connects ground GND inverter 421 and XOR gate 420 causing XOR gate 420 to operate as a buffer and XOR gate 419 to operate as an inverter causing synchronous signal Y to originate on the source side of synchronizer 400. In an alternative embodiment, line 423 may be connected to Vdd causing XOR gate 419 to operate as a buffer and XOR gate 420 to operate as an inverter causing synchronous signal Y to originate on the destination side.

Source-enable signal 315 is produced by logic component 415, here an XOR gate positioned between the output Q of flip-flop 402*b* and the output Q of flip-flop 402*c*. Accordingly, logic component 415 produces source-enable signal 315 for a full SCLK clock cycle when the output Q of flip-flop 402*b* is opposite the output Q of flip-flop 402*c*.

Similarly, destination-enable signal 317 is produced by logic component 417, here an XOR gate positioned between the output Q of flip-flop 404*b* and the output Q of flip-flop 404*a*. Accordingly, logic component 417 produces destination-enable signal 317 for a full DCLK clock cycle when the output Q of 404*b* is opposite the output Q of flip-flop 404*a*.

Figure 4A:
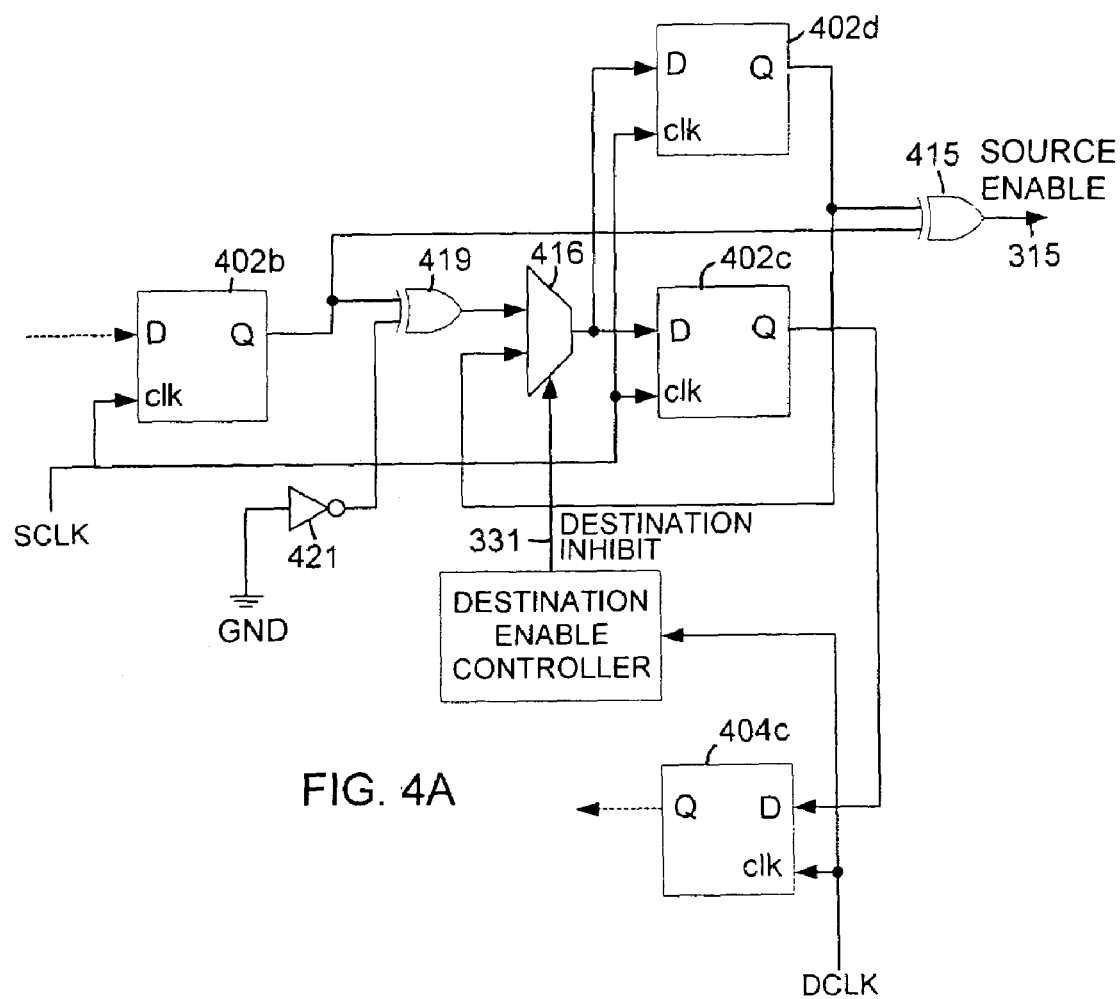
FIG. 4A is a block diagram of an alternative embodiment of FIG. 4.

An alternative embodiment for producing source enable signal 315 is shown in FIG. 4*a*. Here, flip-flop 402*d* is introduced to drive source enable signal 315 and logic component 416. Accordingly, flip-flop 402*d* operates to reduce the load (for example, stray capacitance) on synchronous control signal Y propagating about synchronizer 400. A flip-flop (not shown) may also be similarly introduced to drive destination enable signal 317 and logic component 418 of flip-flop 404*a*.

Domain-synchronizing controller 312 includes N-parallel synchronizers 400 (that is, N-controllable 'fly-wheels') which produce N-stable source enable and destination enable signals 315 and 317, according to N-source inhibit and N-destination inhibit signals 329 and 331. The N-stable source enable and destination enable signals 315 and 317 operate to enable N-source register 311 and N-destination register 313 to accept data at a rate which both domains may handle with reduced meta-stability.

Figure 5:
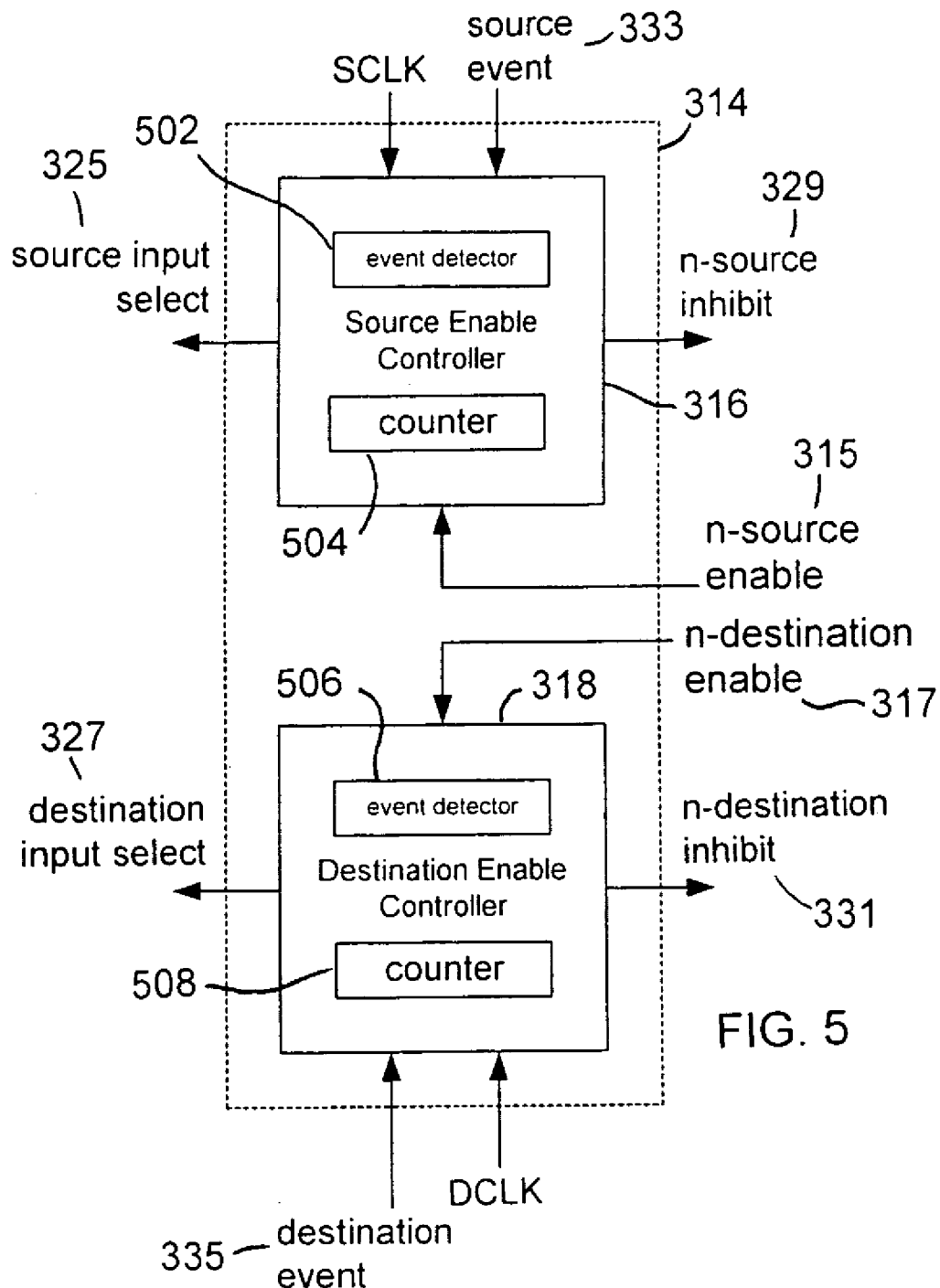
FIG. 5 is a block diagram of an enable controller according to one embodiment of the invention.

Enable controller 314 (FIG. 3) here includes a source-enable controller 316 and a destination enable controller 318. Source-enable controller 316 here includes (FIG. 5) an event detector 502 and a counter 504. Similarly, destination enable controller 318 here also includes an event detector 506 and a counter 508. Source-enable controller produces N-source inhibit signals 329 and source input select signals 325. Destination enable controller 318 produces N-destination inhibit signal 331 and destination input select signals 327.

N-source inhibit signals 329 and N-destination inhibit signals 331 operate to reduce latency in the transfer of data between source domain 302 and destination domain 304 by tuning (that is, optimizing) the rate at which the synchronous-pulse signal propagates though each parallel synchronizer 400 in domain-synchronizing controller 312.

For example, in a system 300 having a two-to-one clock ratio between SCLK and DCLK, the higher speed SCLK domain may have information to transfer twice as often as the slower speed DCLK domain. Here, data may only be generated and/or received every other SCLK cycle in the DCLK domain. Accordingly, to prevent wasting logic and to reduce latency source inhibit signal 329 may be configured (that is, controlled) to prevent the propagation of the synchronous-pulse signal every other SCLK clock pulse. Similarly, for other clock phase and/or frequency ratios (for example, 3-to-1, 4-to-1 and 5-to-1) a similar tuning or optimization based on a clock phase and/or frequency ratio may be accomplished using source and destination inhibit signals 329 and 331 to increase performance and reduce latency for data transfers between domains.

For even better performance, n-source inhibit signals 329 and n-destination inhibit signals 331 may prevent the synchronous-pulse signal from propagating through synchronizer 400 and producing source and destination enable signals until new data is available at either source domain 302 and/or destination domain 304. Here, source event signal 333 and/or destination event signal 335 may be used to detect the presence of new data at either domain 302 and/or 304. Absent an indication of new data, the source and/or destination inhibit signals will be sent to prevent the production of a source-enable and/or destination-enable signal until new data is available at either the source and/or destination domain. Accordingly, source and/or destination inhibit signals 329 and 331 will prevent the occurrence of a source and/or destination enable signal 315 and/or 317 by stopping the propagation of the synchronous-pulse signal until new data is available for transfer at the source and/or destination domain or based on clock ratio described above, whichever is greater.

The source-enable controller 316 and destination enable controller 318 may also operate to produce a source input select signal 325 and destination input select signal 327. The source input select and destination input select signals 325 and 327 operate to select the most up to date synchronized input for the source and destination domains 302 and 304.

Figure 6:
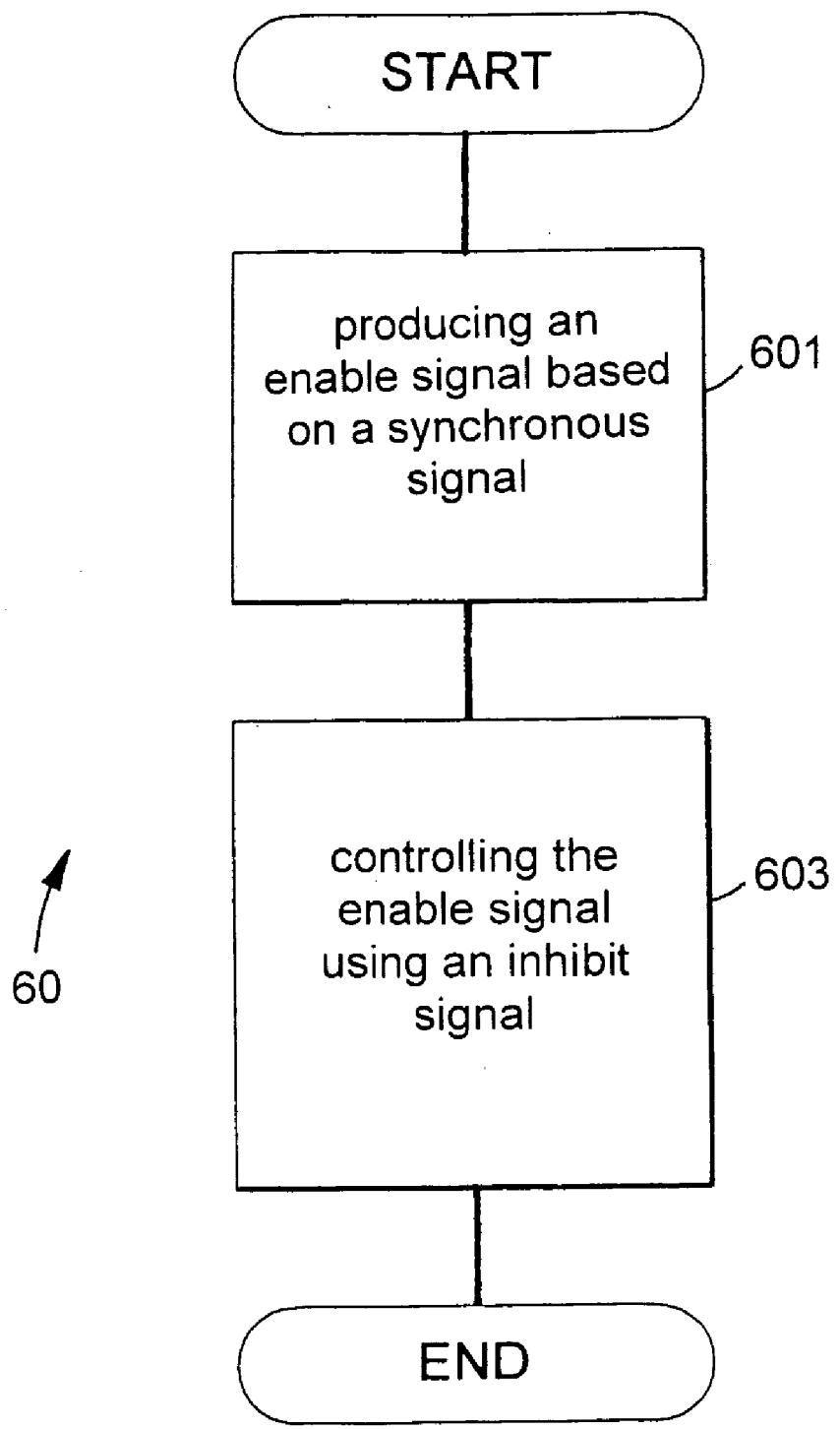
FIG. 6 is a flow diagram according to one embodiment of the invention.

FIG. 6. shows process 60 for minimizing latency while transferring data between a source and destination domain. Process 60 produces (601) an enable signal based on a synchronous-pulse signal. Here, the enable signal enables a register to capture data from a domain operating at a source clock SCLK. Process 60 controls (603) the production of the enable signal with a inhibit signal. Here, the inhibit signal prevents the synchronous-pulse signal from producing the enable signal until the data is available for transmission.

Figure 7:
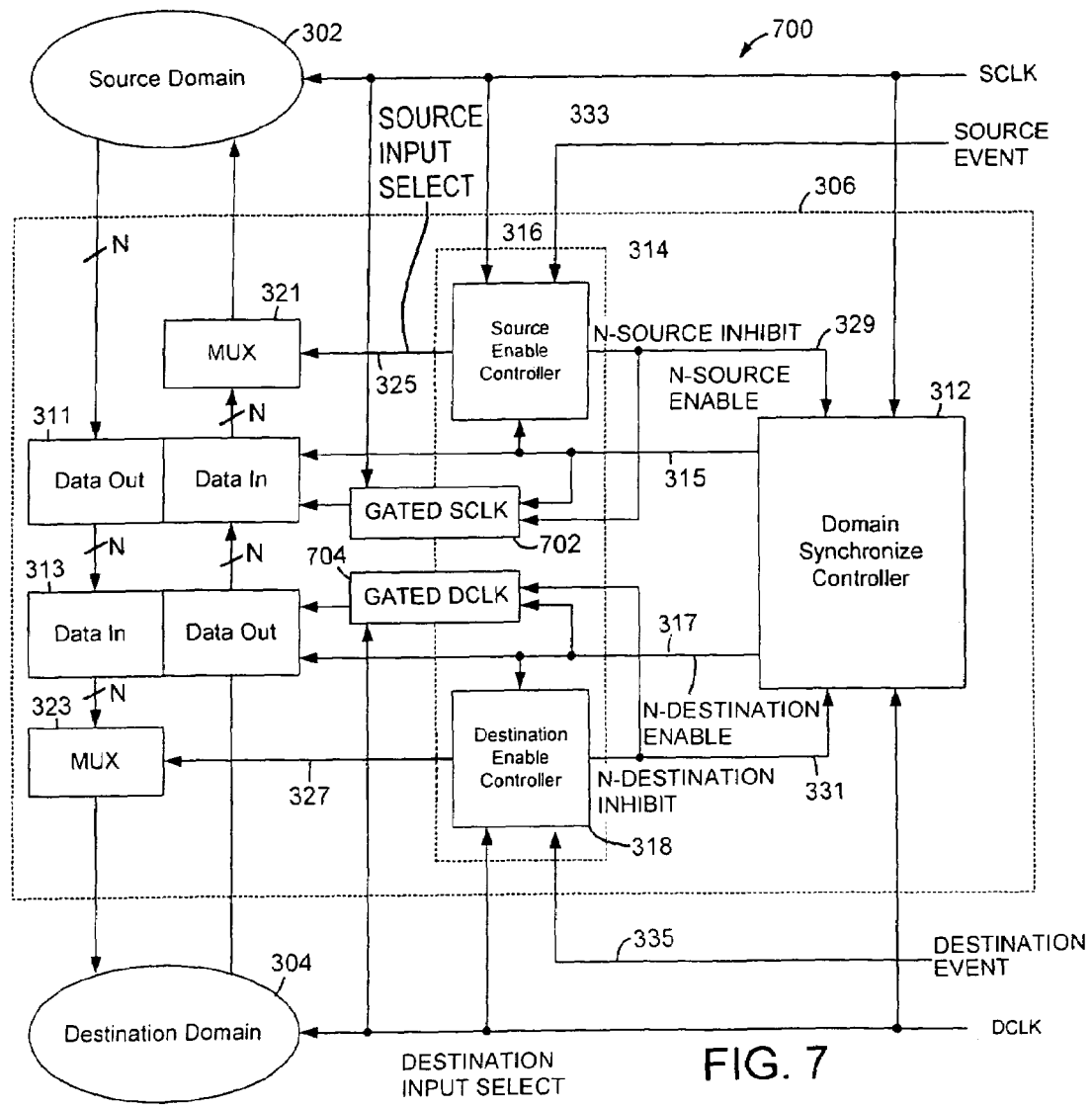
FIG. 7 is a block diagram a computer system according to one embodiment of the invention.
Figure 8:
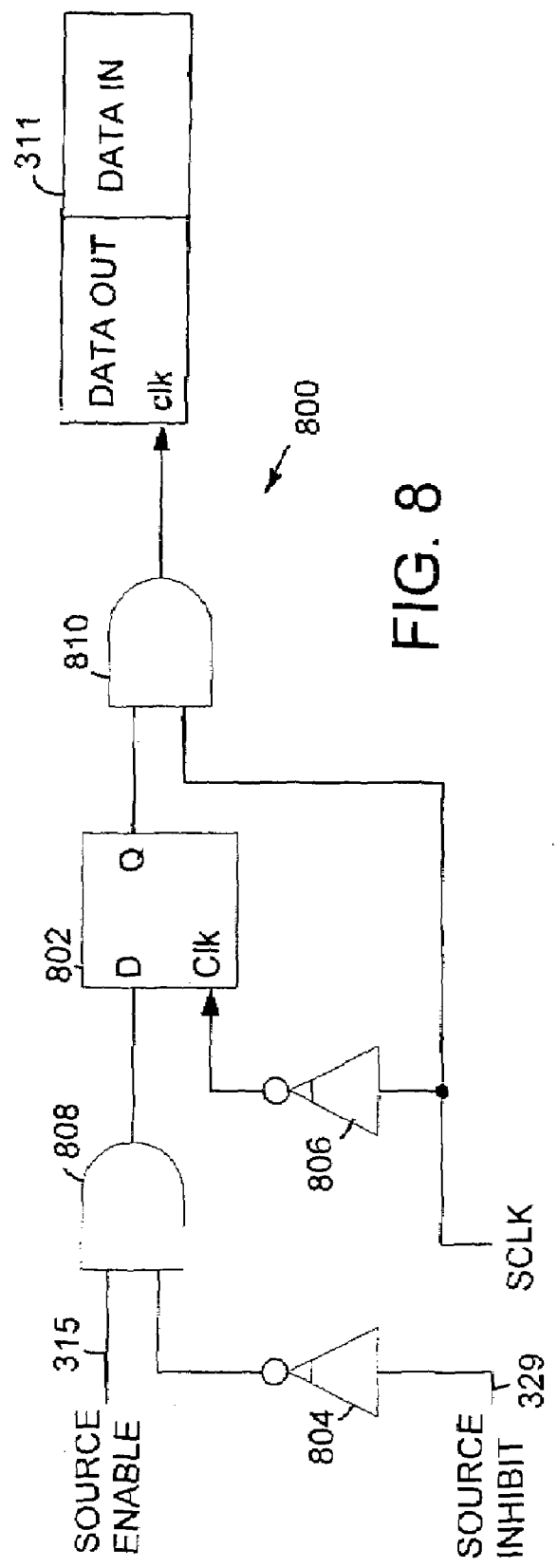
FIG. 8 is a block diagram of a gated-clock in FIG. 7.

FIG. 7 shows a system 700 having gated SCLK 702 and DCLK 704 for driving registers 311 and 313. Gated SCLK 702 includes flip-flop 802 (FIG. 8) and logic components 804, 806, 808 and 810 and uses n-source-enable signals 315 and n-source-inhibit signals 329. Gated DCLK 704 includes similar components and n-destination-enable signals 317 and n-destination-inhibit signals 331.

Logic component 804 (FIG. 8), here an inverter, is positioned between source-inhibit signal 329 and logic component 808. Logic component 804 operates to invert n-source enable signal 329.

Logic component 808, here an AND-gate, receives the inverted n-source inhibit signal 329 and n-source enable signal 315. Accordingly, when the inverted source-inhibit signal 329 is low (that is, when source enable controller 316 stops synchronizer 400) and/or when source-enable signal 315 is low (that is, that is when synchronous-pulse signal has been stopped) then the output of logic component 808 will also be low.

Flip-flop 802 samples the output of logic component 808 on the inverse of clock signal SCLK. Flip-flop 802 captures the output of logic component 808 using the inverse of SCLK to prevent logic component 810 from changing when SCLK is high (that is, flip flop 802 only samples data from logic component 808 in the second half of the clock pulse SCLK).

Logic component 810, here an AND-gate, receives output Q from flip-flop 802 and combines it with clock signal SCLK to create a gated SCLK clock signal, one clock SCLK pulse wide. Accordingly, logic component 810 only draws power from clock pulse SCLK to drive register 311 when both a source-enable signal 315 and a source-inhibit signal 329 indicate that a register 311 may capture data.

Destination enable signal 317, destination-inhibit signal 331 and DCLK may also be combined with a circuit 80, replacing source enable signal 315, source-inhibit signal 329 and SCLK to create a gated DCLK clock. Accordingly, in such a circuit the logic component 810 only draws power from clock pulse DCLK to drive register 313 when both a destination-enable signal 317 and a destination-inhibit signal 331 indicate that a register 313 may capture data.

A number of embodiments of the invention have been described. Nevertheless, it will be understood that various modifications may be made without departing from the spirit and scope of the invention. For example, the number of flip-flops in a loop may vary depending upon the metastability requirements of the system and the positioning of the logic components the domain-synchronizing controller may vary. Accordingly, other embodiments are within the scope of the following claims.

What is claimed is:

1. A circuit comprising:
   a domain-synchronizing controller to produce a source enable signal, the source enable signal enabling capture of data from a source domain; and
   a source-enable controller to produce a source inhibit signal based on a ratio between a source domain clock and a destination domain clock, the source inhibit signal controlling the production of the source enable signal by the domain-synchronizing controller;
   wherein the source enable controller comprises:
      an event detector to monitor a source event signal and the source enable signal; and
      a counter to count the ratio between the source domain clock and the destination domain clock.

2. The circuit in claim 1, wherein the source-enable controller produces the source inhibit signal until the data is available at the source register.

3. A circuit comprising:
   a domain-synchronizing controller to produce a source enable signal, the source enable signal enabling capture of data from a source domain; and
   a source-enable controller to produce a source inhibit signal based on a relationship between a source domain clock and a destination domain clock, the source inhibit signal controlling the production of the source enable signal by the domain-synchronizing controller, wherein the source enable controller produces a source input select signal to control the selection of the data from a plurality of source registers.

4. A circuit comprising:
   a domain-synchronizing controller to produce a source enable signal, the source enable signal enabling capture of data from a source domain;
   a source-enable controller to produce a source inhibit signal based on a relationship between a source domain clock and a destination domain clock, the source inhibit signal controlling the production of the source enable signal by the domain-synchronizing controller; and
   a destination enable controller to produce a destination inhibit signal, the destination inhibit signal preventing the domain-synchronizing controller from producing a destination enable signal, the destination enable signal enabling a destination register to capture the data at a destination domain.

5. A circuit comprising:
   a domain-synchronizing controller to produce a source enable signal based on a synchronous pulse signal, the source enable signal enabling capture of data from a source domain, the domain-synchronizing controller comprising
      a plurality of flip-flops connected in a loop, the plurality of flip-flops including a first flip-flop operating according to a source domain clock and a second flip-flop operating according to a destination domain clock; and
      a first logic component positioned between two of the plurality of flip-flops, the first logic component inverting the output of a prior flip-flop before reaching the input of a next flip-flop to produce the synchronous-pulse signal; and
   a source-enable controller to produce a source inhibit signal based on a relationship between the source domain clock and the destination domain clock, the source inhibit signal controlling the production of the source enable signal by the domain-synchronizing controller.

6. The circuit in claim 5, wherein the source inhibit signal controls a second logic component to prevent the domain-synchronizing controller from propagating the synchronous pulse signal.

7. The circuit in claim 6, wherein the second logic component comprises a multiplexor.

8. The circuit in claim 6, further comprising a third logic component positioned between an input and an output for the first flip-flop, the second logic component producing the source enable signal.

9. The circuit in claim 8, further comprising a fourth logic component positioned between an input and an output for the second flip-flop, the fourth logic component producing a destination enable signal.

10. The circuit in claim 8, wherein the third logic component comprises an XOR gate.

11. A circuit comprising:
 a plurality of flip-flops connected in a loop, the plurality of flip-flops including a first flip-flop operating on a source domain clock and a second flip-flop operating on a destination domain clock;
 a first logic component positioned within the loop, the first logic component inverting the output of one of the flip-flop to produce a synchronous-pulse signal which propagates through the plurality of flip-flops; and
 a second logic component receiving an inhibit signal, the second logic component preventing the propagation of the synchronous-pulse signal based on the inhibit signal.

12. The circuit in claim 11, wherein the first logic component is an inverter and the second logic component is a multiplexor.

13. The circuit in claim 11, further comprising a third logic component positioned between an input and an output to the first flip-flop, the first logic component producing a source enable signal.

14. The circuit in claim 13, wherein the third logic component comprises an XOR gate.

15. The circuit in claim 11, further comprising a third logic component positioned between an input and an output for the second flip-flop, the third logic component producing a destination enable signal based on the input and the output to the second flip-flop.

16. A method comprising:
 producing a source-enable signal based on a synchronous-pulse signal, the source-enable signal enabling capture of data from a source domain, wherein producing the source-enable signal comprises:
  operating a plurality of flip-flops in a loop, the plurality of flip-flops including a first flip-flop operating according to a source domain clock and a second flip-flop operating according to a destination domain clock;
  inverting an output of a prior flip-flop before reaching an input of a next flip-flop to produce the synchronous-pulse signal; and
  preventing a propagation of the synchronous-pulse signal through the plurality of flip-flops based on the source inhibit signal; and
 controlling the source-enable signal with a source-inhibit signal that is produced based on a relationship between the source domain clock and the destination domain clock, the source inhibit signal preventing production of the source-enable signal until the data is available for transmission.

17. The method in claim 16 in which the relationship between the source domain clock and the destination domain clock comprises a ratio between the source domain clock and the destination domain clock.

18. The method in claim 16, further comprising producing the source-inhibit signal until the data is available at the source register or based on the relationship between the source domain clock and the destination domain clock, whichever produces the source inhibit signal for a longer duration.

19. The method of claim 16, further comprising:
 producing a source-input select signal which controls the selection of the data from a plurality of destination registers.

20. The method in claim 16, further comprising originating the synchronous pulse signal before the first flip-flop or the second flip-flop based on a selection signal.

21. A circuit, comprising:
 a first logic component that receives a source enable signal and a source inhibit signal;
 a flip-flop that samples an output of the first logic component based on an inverted signal of a domain clock; and
 a second logic component that receives an output of the flip-flop and the domain clock, the second logic component producing a gated clock pulse to drive a domain register.

22. The circuit in claim 21, wherein the first and second logic components are AND-gates and further comprising:
 an inverter which inverts the source inhibit signal prior to being received by the first logic component.

23. An apparatus comprising:
 a domain synchronizing controller to produce a source enable signal based on a synchronous pulse signal, the source enable signal enabling capture of data from a source domain; and
 a source enable controller to produce a source inhibit signal that controls production of the source enable signal by the synchronizing controller;
 wherein the domain synchronizing controller comprises flip-flops connected in a loop, the flip-flops including a first flip-flop operating at a source clock frequency and a second flip-flop operating at a destination clock frequency, and
  a first logic component positioned between two of the flip-flops, the first logic component inverting the output of a prior flip-flop before reaching the input of a next flip-flop to produce the synchronous pulse signal.

24. A method comprising:
 producing a source-enable signal based on a synchronous-pulse signal, the source-enable signal enabling a source register to capture of data from a source domain;
 controlling the source-enable signal with a source-inhibit signal, the source inhibit signal preventing the synchronous-pulse signal from producing production of the source-enable signal until the data is available for transmission;
 monitoring a source-event signal; and
 producing a source-input select signal that controls the selection of the data from destination registers.

25. A method comprising:
 producing a source-enable signal based on a synchronous-pulse signal, the source-enable signal enabling a source register to capture of data from a source domain; and
 controlling the source-enable signal with a source-inhibit signal, the source inhibit signal preventing the synchronous-pulse signal from producing production of the source-enable signal until the data is available for transmission;
wherein producing the source-enable signal comprises
operating flip-flops in a loop, the flip-flops including a first flip-flop operating according to the source domain clock and a second flip-flop operating according to the destination domain clock,
inverting an output of a prior flip-flop before reaching an input of a next flip-flop to produce the synchronous-pulse signal, and
preventing a propagation of the synchronous-pulse signal through the flip-flops based on the source inhibit signal.

* * * * *